US 6,650,242 B2

(12) United States Patent
Clerk et al.

(10) Patent No.: US 6,650,242 B2
(45) Date of Patent: Nov. 18, 2003

(54) MOBILE PLANT PROXIMITY DETECTION AND WARNING SYSTEM

(75) Inventors: Frederick George Clerk, VIC (AU);
Hossien Mahdavian, VIC (AU)

(73) Assignee: Embridge Lake Pty Ltd, Victoria (AU)

( * ) Notice: Subject to any disclaimer, the term of this patent is extended or adjusted under 35 U.S.C. 154(b) by 0 days.

(21) Appl. No.: 09/866,566

(22) Filed: May 25, 2001

(65) Prior Publication Data

US 2002/0175825 A1 Nov. 28, 2002

(51) Int. Cl.⁷ ............................................. G08B 23/00
(52) U.S. Cl. ........................ 340/573.1; 340/425.5; 340/539.1; 340/902
(58) Field of Search ........................... 340/573.1, 902, 340/904, 906, 919, 691.3, 545.1, 917, 686.1–686.6, 687, 901, 539.1, 425.5

(56) References Cited

U.S. PATENT DOCUMENTS

| | | | | |
|---|---|---|---|---|
| 4,115,757 A | * | 9/1978 | Blahunka | 340/906 |
| 4,247,922 A | * | 1/1981 | Jackson et al. | 367/6 |
| 4,704,610 A | * | 11/1987 | Smith et al. | 340/906 |
| 4,775,865 A | * | 10/1988 | Smith et al. | 340/906 |
| 4,841,302 A | * | 6/1989 | Henry | 342/20 |
| 5,187,476 A | * | 2/1993 | Hamer | 340/906 |
| 5,235,329 A | * | 8/1993 | Jackson | 340/902 |
| 5,424,717 A | * | 6/1995 | Platt et al. | 340/551 |
| 5,440,290 A | * | 8/1995 | McCullough et al. | 340/552 |
| 5,572,202 A | * | 11/1996 | Regel et al. | 340/917 |
| 5,727,758 A | * | 3/1998 | Penza et al. | 246/124 |
| 6,002,332 A | * | 12/1999 | King | 340/545.1 |
| 6,094,149 A | * | 7/2000 | Wilson | 340/904 |
| 6,208,260 B1 | * | 3/2001 | West et al. | 340/691.3 |
| 6,232,887 B1 | * | 5/2001 | Carson | 340/903 |
| 6,326,903 B1 | * | 12/2001 | Gross et al. | 340/988 |

* cited by examiner

Primary Examiner—Benjamin C. Lee
Assistant Examiner—Phung Nguyen
(74) Attorney, Agent, or Firm—Killworth, Gottman, Hagan & Schaeff LLP (57) ABSTRACT

A movement detection and warning system is provided and includes a transmitter means for transmitting a signal in association with an event or an object. The signal is adapted for triggering a detector means. The detector means is tuned to only detect the signal transmitted by the transmitter means when the detector is located within a predetermined distance from the transmitter means. The detector means activates an alarm means in response to being triggered by the transmitted signal thereby providing an early and distinct warning to people in the vicinity of the detector in order to eliminate or reduce the chances of the person sustaining injury. According to another aspect of the present invention there is provided a method of warning a person of the proximity of an object or event. According to the method, the object or event is associated with a transmitter means for transmitting a signal. The signal triggers a detector means and the detector is tuned to only detect the signal transmitted by the transmitter means. When the person and object or event are located within a predetermined distance from each other, the transmitter means transmits a signal to the detector means. In response, the detector means activates an alarm means in order to provide an early and distinct warning to the person in the vicinity of the object or event to alert the person to the presence of the object or event.

30 Claims, 3 Drawing Sheets

FIG. 3

MOBILE PLANT PROXIMITY DETECTION AND WARNING SYSTEM

BACKGROUND OF THE INVENTION

The present invention relates generally to movement detection systems and particularly to movement detection systems in combination with warning devices that are activated by the movement detection systems. More particularly, the present invention relates to improvements in systems for detecting the proximity of movement within a hazard zone or area, particularly the movement of mobile plant and other moving vehicles or of the movement of people approaching a hazard, and then warning people of the presence of such vehicles in close proximity to them or of them approaching the hazards when detected by the detection systems in order to reduce the risk of accidents which could result in injury or death or damage. Even more particularly, the present invention relates to a fork-lift truck alert system to warn people in close proximity to the fork-lift of its presence so that people are aware that the fork-lift is close by so that they can take evasive action or remain out of harm's way until the fork-lift moves away or departs the hazard zone. Also, the present invention relates to a portable hazard warning system that alerts people that they are approaching a hazardous area or zone.

The present invention finds particular application as a safety system comprising the proximity detection system and warning system for use in a work place, such as for example, a factory, warehouse, transportation facility, such as an airport, or the like to alert workers to the proximity of a hazard.

Although the present invention will be described with particular reference to one form of the detection system and warning system activated by operation of the detection system for alerting people to the presence of a fork-lift truck or similar in a work environment, it is to be noted that the scope of the present invention is not limited to the described embodiment, but rather the present invention is more extensive in scope by including other forms and arrangements of both the movement detection system and the warning system and the uses of the forms of both systems in other applications including both fixed and portable systems.

Mobile plant, including fork-lift trucks, pallet carriers, road transport vehicles, tractors, cranes, excavators, vehicles generally and the like often present a significant injury hazard to personnel in the work environment such as for example in factories, warehouses, transportation facilities or the like, when these vehicles are operating in areas where pedestrians may also be present, particularly in confined areas where pedestrians and vehicles share a common path, roadway or similar. As the vehicles are often large and heavy, even when travelling at a slow speed, any pedestrian collision accidents are generally serious or fatal to the pedestrian, and often result in damage to surrounding structures. There have been some other systems in use for detecting and warning of the presence of mobile plant and vehicles. For example, one previously available technique employed one or more fixed linear infra-red beam detector or detectors which trigger an alarm when the linear beam impinging on the detector is broken or otherwise interrupted by passage of a vehicle across the beam which temporarily disrupts the beam allowing the alarm to be activated. Another previously available example is the use of a visible flashing hazard warning light mounted on the vehicle or mobile plant, particularly at or towards the top of the vehicle where it could be seen more readily, and the use of the vehicle's horn or reversing beeper to warn pedestrians of the proximity of the vehicle to the pedestrian in high risk areas, such as for example, in shared carriageways or similar. A further previously considered proposal is the use of radio frequency devices, such as for example, vehicle mounted transponders and associated fixed detection devices or readers to detect the presence of the vehicle or plant which activates a warning device such as either a visible or audible warning alarm.

However, all of these previously available methods and devices have not been entirely successful for a variety of reasons since they suffer from one or more various disadvantages and shortcomings. In the example in which a fixed linear infra-red beam sensor is used to generate a pedestrian warning alarm, the main disadvantages are that the alarm can be triggered by movement of pedestrians through the beam as well as by passage of vehicles through the beam, which produces many "false-alarms" or "false-triggerings" of the warning device which has a tendency to cause complacency in pedestrians and other nearby workers. Further, the coverage of an extended detection area providing reliable and sufficiently early warning in all instances is difficult, as well as expensive, to install and to maintain due to the linear nature of the beams of radiation.

The use of a flashing hazard lamp, horn, reversing beeper or similar devices fulfil a basic safety role, but have the disadvantages that the hazard lamp or other visible warning device may not be visible to a pedestrian at an obscured location, such as at a doorway, in a corridor or at a corner where the vehicle is unsighted by the person until it is almost too late to avoid a collision. This is particularly so when the vehicle and pedestrian simultaneously approach the same closed swinging door from either side. Further, ambient site noise may mask the audible horn warning because the horn may be sounded on the other side of a doorway or closed door or the operator may forget to operate the horn at all of the high hazard locations so that the pedestrian is unaware of the approaching vehicle. Radio frequency transponder-based systems have the typical disadvantages of high directionality, and/or of restricted range which is typically of up to a few meters only which does not provide sufficient coverage of the work area and which is often insufficient to provide adequate warning for the person, respectively. There is also the difficulty in defining and/or restricting the zone of coverage using these types of systems which in turn restricts their usefulness in such applications. As the radio frequency transponder-based systems are essentially linear it is difficult to comprehensibly cover a designated area of the workplace unless a complex array of components are used. Accordingly, there has not, at the time of developing the present invention, been any significant application of radio frequency-based technology to fork-lift or mobile plant safety warning systems, or to portable hazard warning systems despite radio-based technologies being available for many years.

Non-transponder based radio frequency systems have also been tried, however these typically suffer from difficulties in defining a stable triggering distance leading to false alarms being triggered and also difficulties in containing the triggering signal such that it does not trigger detectors in other zones by passing through walls.

Therefore, it is an aim of the present invention to provide a detection system for detecting the presence of a mobile plant, such as a fork-lift truck, in the vicinity of the detection system which activates a warning system to alert people in close proximity of the presence of the vehicle in response to detection of the presence of the vehicle in order to reduce or eliminate the risk or injury or damage caused by collision with the vehicle. It is also an aim of the present invention to provide a portable hazard detection and warning system for personal use.

BRIEF SUMMARY OF THE INVENTION

According to the present invention there is provided a movement detection and warning system comprising a transmitter means for transmitting a signal in association with an event or an object, the signal being adapted for triggering a detector means, said detector means being tuned to only detect the signal transmitted by the transmitter means when the detector is located within a predetermined distance from the transmitter means, said detector means activating an alarm means in response to being triggered by the transmitted signal thereby providing an early and distinct warning to people in the vicinity of the detectors in order to eliminate or reduce the chances of the person sustaining injury.

According to another aspect of the present invention there is provided a method of warning a person of the proximity of an object or event comprising associating the object or event with a transmitter means for transmitting a signal, the signal triggering a detector means, said detector being tuned to only detect the signal transmitted by the transmitter means so that when the person and object or event are located within a predetermined distance from each other the transmitter means transmits a signal to the detector means such that the detector means activates an alarm means in order to provide an early and distinct warning to the person in the vicinity of the object or event in order to alert the person to the presence of the object or event.

Typically, the movement detection system is a combined movement detection and warning system. More typically, the movement detection and warning system provide advance warning of the presence of a hazard or potentially dangerous object or event. More typically, the object is a moveable object. Even more typically, the moveable object is a vehicle or mobile plant equipment, preferably a fork-lift truck. Typically, the event is a hazardous event, such as a disaster area, accident site, spill of toxic chemicals or similar.

Typically, the transmitter means is rotatable or is provided with means for rotation. More typically, the transmitter means transmits a rotating signal. Even more typically, the transmitted signal is a rotating encoded fan-shaped beam, preferably a rotating infra-red beam. Even more typically, the transmitted signal is transmitted through an angle of 360° around the item, object or event. Even more typically, the transmitted signal is pulsed, discontinuous, continuous, or the like.

Typically, the transmitted signal is an infra-red beam and the transmitter means is a infra-red transmitter.

Typically, the transmitter means is located on the vehicle, item, object or close to the event.

Typically, the detector means detects the encoded infra-red signal. Typically, the detector means is triggered by the signal from the transmitter means when the transmitter means is within a predetermined distance from the detector means.

Typically, the vehicle may approach the detector from any horizontal direction as the transmitter rotates to send a transmitted beam through 360° around the vehicle.

Typically, the infra-red transmitter embodies an encoded infra-red source and associated electronic systems and rotating mirror contoured to produce a rotating fan-shaped beam of infra-red light having a narrow dimension in the horizontal plane and a wider dimension in the vertical plane such that an invisible warning zone is produced around the vehicle when it is in operation.

Typically, the infra-red transmitter is a static array of light-emitting Diodes (LEDs). More typically, the individual LEDs or a selected bank or banks of LEDs are able to be illuminated by an electronic circuit or sequencing circuit. More typically, the LEDs are operated to produce a rotating fan-shaped beam of infra-red illumination. Typically, the LEDs are driven from one switch. More typically, the LEDs are arranged in arrays and are operated in a prearranged sequence or sequences.

Typically, the detector embodies the detection and alarm functions. More typically, the detector may be battery powered. More typically, the detector may be worn on the apparel or safety clothing of personnel for activation when the person becomes within a predetermined distance of the vehicle or mobile plant or of a hazard/hazardous area or zone or event. Typically, the alarm means includes an audible and visible warning. More typically, the personal detector provides an audible and/or visible warning to the wearer of the personal alarm when the person is located within the warning zone of the vehicle mounted transmitter or of a portable transmitter.

Typically, the transmitter is battery, mains or solar powered. More typically, the transmitter is fixed or portable.

Typically, the signal transmitted by the transmitter means is used to remotely operate access control devices. More typically, the access control devices include boom gates, swing, roller and sliding doors or other operating mechanisms.

BRIEF DESCRIPTION OF THE SEVERAL VIEWS OF THE DRAWINGS

The present invention will now be described by way of example with reference to the accompanying drawings in which.

DETAILED DESCRIPTION

Figure 1:
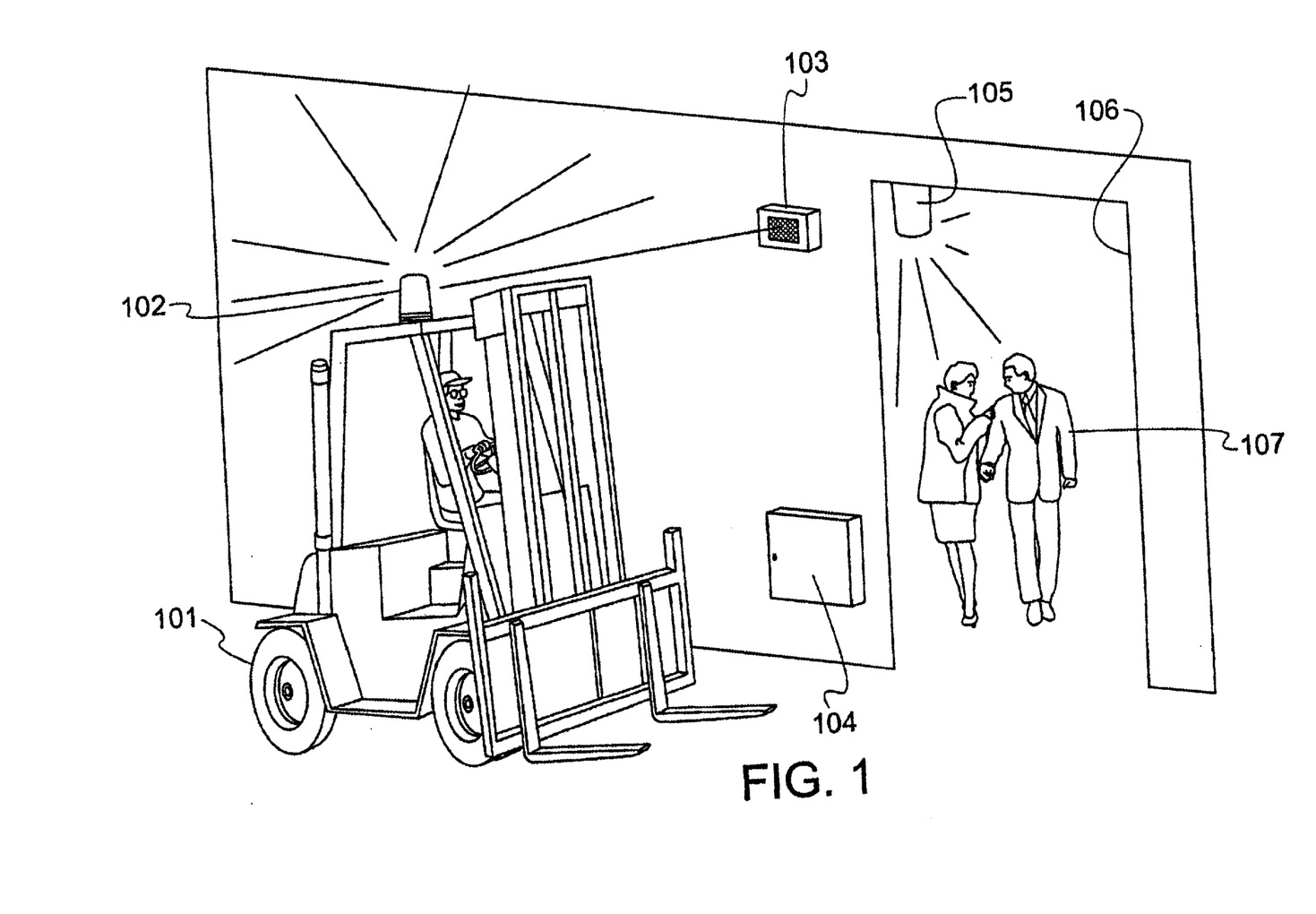
FIG. 1 is a schematic view of one form of the overall detection and warning system of the present invention.

With particular reference to FIG. 1, one form of the overall detection and warning system will now be described in general to provide an idea of the system and how it operates. A mobile plant, in the form of a fork-lift truck, generally denoted as 101, is provided with an infra-red transmitter 102 for transmitting a newly developed infra-red fan beam transmission. Transmitter 102 is energised, such as for example from the internal power supply of fork-lift truck 101, such as for example from the battery or batteries of fork-lift truck 101. Infra-red transmitter 102 is always transmitting a rotating fan shaped beam of radiation (invisible light) around the vehicle whenever the vehicle is operational. Newly developed fixed infra-red radiation detectors 103 are provided throughout the building or similar at spaced apart strategic locations along the itinerary of the fork-lift truck 101. Fixed detectors 103 are triggered by the infra-red radiation transmitted by transmitter 102 when the transmitter is within a specified range of the detector 103. The rotating infra-red transmitted beam effectively provides an invisible "warning zone" throughout 360° around fork-lift truck 101 extending for up to ten meters or more in effective radius, depending on the particular transmitter design characteristics, around fork-lift 101. A zone controller 104 is provided at a convenient location for receiving signal from infra-red detector 103 and sending a corresponding signal to a suitable warning device in the form of a warning light/siren 105. When one or more of the fixed infra-red detectors 103 detect the presence of an encoded infra-red transmitter beam indicating that fork-lift 101 is in close proximity, the detectors activate pedestrian audible and/or visible alarms 105 via zone controller 104.

In one embodiment zone controller 104 terminates the cables from detectors 103 and alarms 105 and supplies power to detector 103 and the circuits associated with alarm 105 as well as facilitating pre-setting of the alarm timing characteristics for each detection zone. The alarms 105 may be located remote from where detection occurs or remote from the location of the detectors or maybe integrated into the detector in the case of a small personal detector and alarm.

In another embodiment, pedestrians 14 are provided with personal infra-red detectors so that as the pedestrians 107 approach a hazardous area such as doorway 106 the personal detectors carried by the pedestrians 107 detect the presence of the fork-lift truck 101 by sensing the infra-red transmission such that the detectors activate a personal alarm to warn the pedestrians of the approaching fork-lift truck 101.

In other embodiments, as an example of remote siting of the detectors, alarms 105 maybe located on a pedestrian walkway that approaches the hazard zone. In this way, pedestrians can be clearly warned of the presence of fork-lift truck 101 or similar when the fork-lift truck enters or is in the or one of the designated hazard zones, even though the vehicle may not yet be visible to the pedestrians. Thus, the present invention can provide an early and distinct warning to pedestrians automatically without having to rely on operators of the fork-lift trucks remembering to activate the warning alarms. The use of a rotating coded infra-red light beam provides pervasive coverage of an entire substantially circular area around the vehicle. In this manner, the detectors will be triggered when the vehicle approaches them from a wide range of different angles when the vehicle is closer than the predetermined distance between the transmitter and the detector for the detector to activate the warning system.

The detection and warning system of the present invention may be applied, in one embodiment, to improving the safety of pedestrians and mobile plant operations in industrial and other commercial operations including transport facilities, military or other areas associated with the intensive movement of vehicles in a crowded or confined area in which vehicles and pedestrians share a common pathway. Other applications of the systems of the present invention also include the use of a battery powered version of the transmitter which can be mounted at a hazardous site such as for example, an excavation, road works, natural disaster event or similar and which will trigger small versions of the detector/alarm devices worn or carried by personnel when approaching the hazard zone.

Details of the circuitry and components of the present invention will now be described in detail with reference to FIGS. 2 to 4.

Transmitter 102, is mounted on and powered by fork-lift 101 or other mobile plant equipment.

Transmitter 102 emits a short range electromagnetic signal schematically depicted by fan shaped area which will be referred to as beam 13, with the effective range of transmission being adjustable depending upon site requirements and the predetermined distance between transmitter 102 and detector 103 necessary to activate alarm 105 when vehicle 101 enters the hazard zone. Signal 13 is typically infra-red or other suitable or convenient electromagnetic radiation. The present invention embodies novel features and concepts for this transmitter. One form of the transmitter and radiation source will now be described. However, it is to be noted that other forms could be used.

In one embodiment, transmitter 102 is provided wit one or a group of infra-red Light Emitting Diodes (LEDs) 18 mounted in a central housing forming transmitter 102, in place of the traditional incandescent bulb of a rotating hazard lamp, of the type typically used in industry, or of a purpose built equivalent. Transmitter 102 is provided with an adjustment means for adjusting the transmitter output power and therefore to pre-set the effective range of the system for particular applications. One form of the adjustment means is typically a potentiometer which is shown in FIG. 2 as a commercial hexagon shaft lock nut 10 which ensures that the setting once adjusted is not inadvertently changed such as by vibration or the like. The LEDs 18 do not themselves rotate, however the illumination from the LEDs 18 is directed upwardly by and impinges upon a specially shaped reflective mirror 9, which is rotating in the horizontal plane affixed to a turntable 8 driven by an electric motor capstan 12 and belt arrangement 12a The reflective surface of the mirror 9 is shaped especially to give a beam of radiation which is narrow in the horizontal plane, but wide in the vertical plane, as depicted by beam 13, to produce maximum detectable range and beam coverage for positioning of the detectors and detection of the beam by detectors. The rotation of the mirror 9 thus sweeps beam 13 continuously through 360°, such that the emitted radiation may be projected in all lateral directions and around transmitter 102 in a 3-dimensional fan shape around transmitter 102 during each revolution. As illustrated in FIGS. 3 and 4, the beam 13 can be transmitted through 360° around the transmitter in a horizontal plane. The beam 13 can also be transmitted through about 180° in a vertical plane.

Mirror surface 9 may take several forms, depending upon the illumination pattern required for a particular application of the detection and warning system of the present invention.

In a typical implementation of the invention, the transmitter 2 contains new electronic subsystems and circuitry and components which will now be described. The new system includes a power supply and regulator 1, which conditions the direct current supply provided from the vehicle, such as for example, from the battery of the vehicle, and supplies power to the various operating circuits of the systems. A carrier oscillator 2 generates a square wave signal, in this case a 375 kHz signal, which is then modulated by a modulator 4 with another signal generated by oscillator 3 which is typically a 3 kHz oscillator. The modulated 375 kHz signal then drives the infra-red LED driver circuits 5 which produce the modulated output beam 13. Beam 13 is modulated as described, such that this radiation may be reliably detected by one form of detector 103 and discriminated against interference by natural or man-made electromagnetic sources, which would otherwise cause false triggering to occur resulting in unwanted activation of alarm 105.

Figure 2:
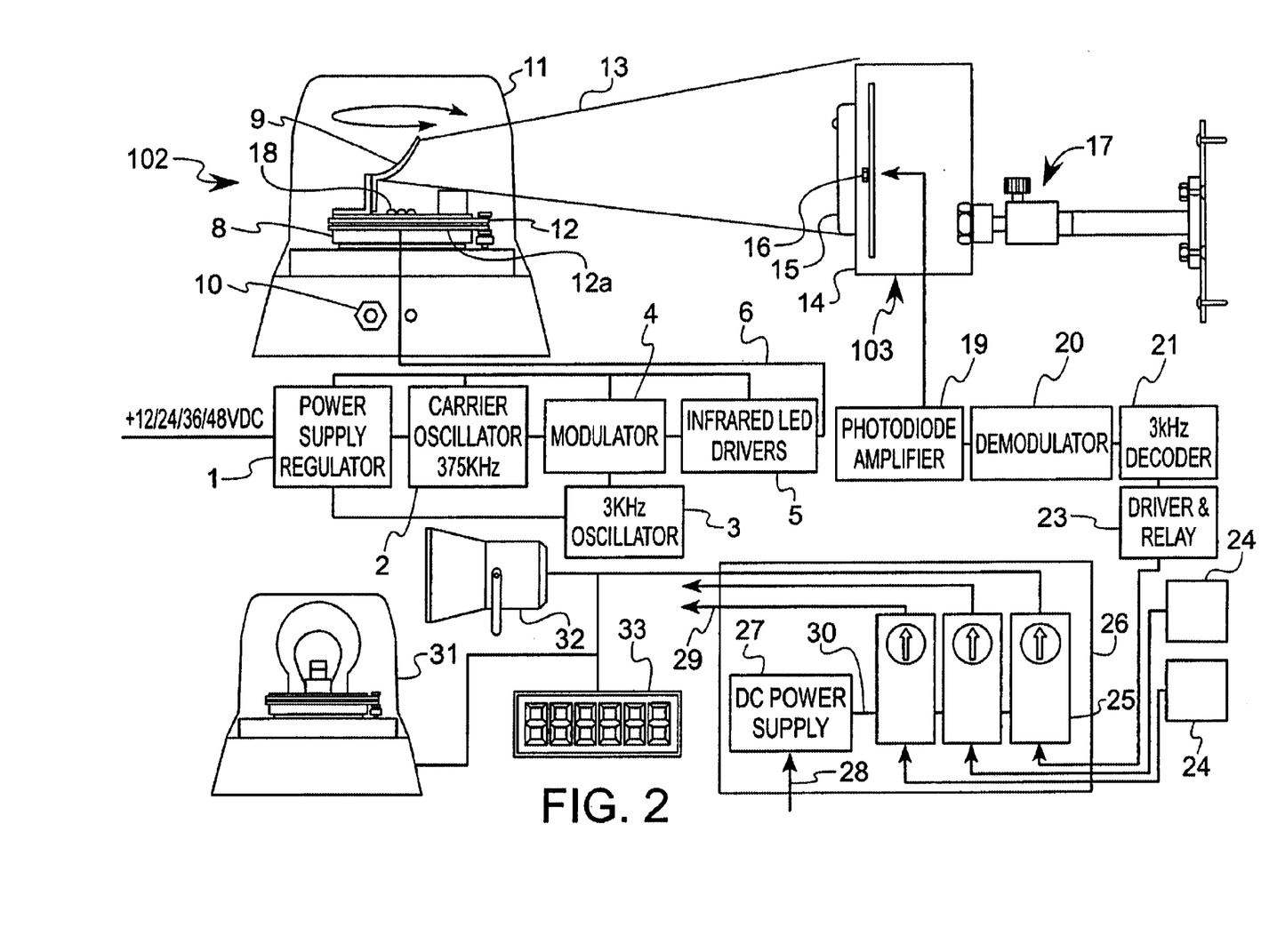
FIG. 2 is a schematic view of the components of one form of the detection and warning system of the present invention showing the circuit details and components in schematic block form.

Still with reference to FIG. 2, beam 13 is rotating such that when the transmitter 102 comes within the operating range of the detector, the received electromagnetic signal within the pattern of beam 13 momentarily falls on photo-detectors 16, after passing through the infra-red translucent protective cover 15 provided on housing 14. Photo-detector 16 thus receives momentary bursts of infra-red radiation from the rotating fan beam emanating from transmitter 102. Detector 103 is adjustably connected to a suitable substrate such as a wall of the factory or similar by adjustable connector 17. These short bursts of signal are amplified by the photodiode amplifier 19, before being demodulated by demodulator 20. Demodulator 20 separates the encoded 3 kHz modulation signal from the original signal. This is then connected to a tuned decoder circuit 21, which is tuned to produce a digital-ouput-on state only if a 3 kHz signal burst is sustained for a minimum time, typically for about 5 to 10 milliseconds, otherwise the output remains in the off state. It is to be noted that the detection system and the modulation frequencies selected may be changed in different embodiments to operate with more or less burst time. The output of decoder 21 is routed to a driver and relay circuit 23, which is connected to one form of a zone controller which is denoted as 26 in FIG. 2 by cable or other suitable means. More than one detector 103 may be used in any particular application, and the output circuit of the detectors may be connected in parallel to one zone controller circuit in the case where more than one detector is used in one hazard zone, or alternatively one or more detectors indicated in block form 24 may be used for different hazard zones. For each hazard zone, the zone controller has an individual alarm circuit, which may contain a timer 25, which permits the on-time of the alarm once triggered to be pre-set for a period of typically up to 10 seconds and is retriggerable such that it stays on and refreshes the 10 second timer each time new pulses are detected. This feature effectively masks the intermittent nature of the intermittent triggering bursts from radiation beam 13, and produces continuous rather than discontinuous energisation of the pedestrian warning devices for the duration of the presence of the transmitter, and thus the vehicle, in the detection zone.

The pedestrian alarm configuration may take many forms, including but not limited to that shown in FIG. 2 in which an audible alarm 32, a flashing visible hazard beacon 31, and an illuminated character display sign 33 are used either alone or in any combination. Mains electrical power 28 is supplied also to a DC power supply 27 in the zone controller 26, which in turn provides power for the detectors 24. Timers 25 contain a relay or contactor to energise the alarm circuits.

Figure 4:
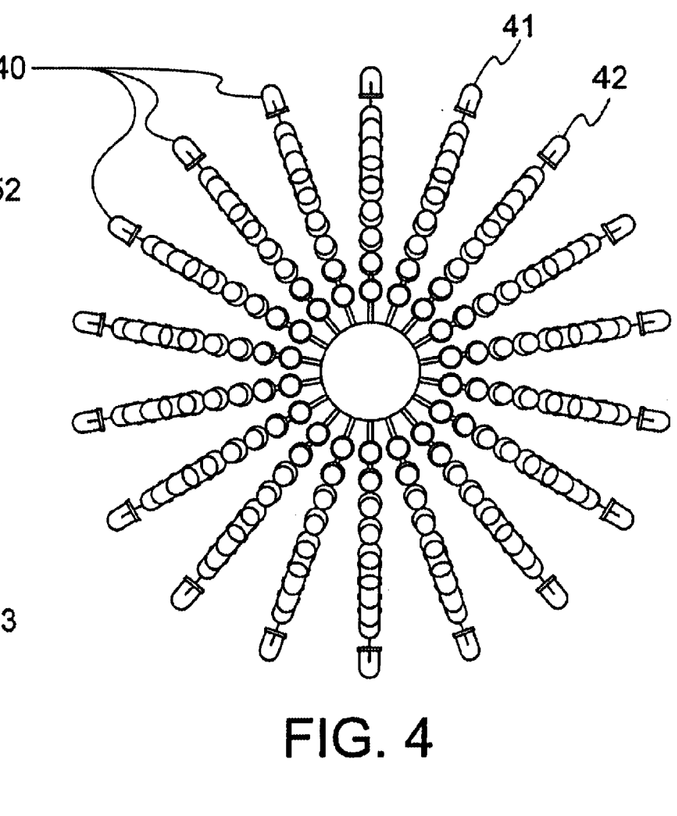
FIG. 4 is a top plan view of the transmitter means of FIG. 3.

Referring to FIG. 4, an alternative novel static embodiment of transmitter 102 will now be described. This form of transmitter 102 consists of a phased array of closely spaced apart light emitting diodes 40 arranged in a hemispherical or spherical shape, such that the radiation from each diode is emitted outwardly at a different angle from each other. Each diode 40 would be typically able to emit at a tangent to its hemispherical surface. The radiation pattern and beam angle of each diode 40 is selected to overlay with the other diodes 40, such that if they were all illuminated at one time, the radiation from the collected hemispherical surfaces would be in all directions, including from below a horizontal line through the unit, extending up to being directed vertically upwards. In this embodiment, each diode 40 (or a selected group of diodes) is connected to a suitable driver circuit. Each driver circuit is connected to a digital diode array selection circuit, driven from a pulse generator or more intelligent circuit, such that individual diodes or selected groups of diodes may be switched on and off in a predetermined or prearranged sequence. In this way, it is then possible to configure the circuit for particular applications electronically. In one example, a line of LEDs 41 extending from the top central one out to one particular equatorial LED is enabled and switched on, with all of the others being switched off. A sequencing circuit embodiment in the device then allows the next line of LEDs 42 to be illuminated with the first line 41 being switched off. The sequencing circuit may be set up electronically, such as for example, by selection switches or an intelligent processor, or the like, to thus illuminate each line or group of LEDs for a preset time, before moving on to the next one and so on. In this way, a moving fan beam or other pattern depending on the group being selected is generated, without the need for a mechanical scanning device or rotation device or similar. Particular groups of LEDs may be skipped or disabled depending on the collective beam shape required, and the sequencing rate can be varied from very low to very high speeds. Also, the angle of scan can be varied electronically, so that the collective beam is transmitted at particular angles only within the 360° of possible sweep. In this way, the device can be configured to say, only transmit in the forward direction, or in any other desired direction. This transmitter also has applications in other fields.

Figure 3:
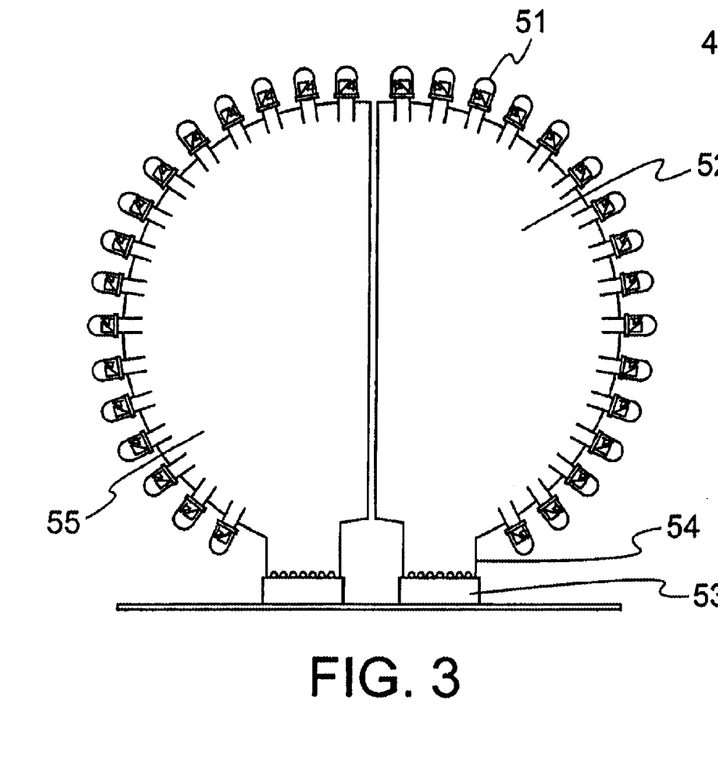
FIG. 3 is a side cross-sectional view of one form of the transmitter means useful in the detection and warning system of the present invention.

One method of construction of the array of FIG. 4 is shown in FIG. 3, in which each line of LEDs 51 in the array is mounted on an individual circuit board 52 and 55. These circuit boards have plugs 54 and sockets 53 through which the electrical connections are made with the processing systems to control the sequencing of operation of the LEDs.

The entire system constitutes a hazard or proximity warning system, which is capable of signalling the proximity of plant or other hazard to pedestrians or workers, thus improving the safety of the pedestrians and/or workers.

Advantages of the present invention include the following: The on-range and the cut-off range of the system can be made more predictable and stable with infra-red than with a radio frequency. The infra-red signal does not penetrate walls, and hence the detection zone can be more readily defined by the building walls than what would be the case for a radio frequency signal, which might penetrate a wall and falsely trigger detectors in a different zone located in another part of the building. The invisible nature of the beam does not create a source of annoyance for people located in the area. The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A movement detection and warning system comprising a transmitter for transmitting an infra-red signal in association with die occurrence of an event or an object, the signal being adapted fir triggering a detector, said transmitter being mounted on a moveable vehicle, said movable vehicle being movable wit respect to the detector, said detector being tuned to only detect the infra-red signal transmitted by the detector when the detector is located within a predetermined distance from the transmitter, said detector activating an alarm for providing a warning to a person in the vicinity of the alarm in response to being triggered by the transmitted infra-red signal thereby providing an early and distinct warning to the person in the vicinity of the detector in order to eliminate or reduce the chances of the person sustaining injury, wherein the infra-red signal is transmitted through substantially 360° around the transmitter.

2. A system according to claim 1, in which the infra-red transmitted signal is a fan shaped beam.

3. A system according to claim 2, in which the fan shaped beam is transmitted through an angle of 360°, either continuously or intermittently or pulsed.

4. A system according to claim 3, in which the infra-red beam is a rotating encoded transmission of infra-red radiation.

5. A system according to claim 4, in which the infra-red beam is transmitted through 360° by rotation.

6. A system according to claim 5, in which the event or object is movement of a vehicle through a prearranged zone or a vehicle arriving at a predetermined location.

7. A system according to claim 6, in which the vehicle is a mobile plant or industrial equipment.

8. A system according to claim 7, in which the vehicle is a fork-lift track.

9. A system according to claim 8, in which the infra-red transmitter is mounted on the fork-lift truck.

10. A system according to claim 6, in which the detector is located remote from the vehicle and is triggered in response to detecting the presence of the infra-red signal.

11. A system according to claim 6, in which the alarm system is activated in response to the detector detecting the presence of the infra-red signal, when the vehicle is located at or within the predetermined distance between the transmitter and the detector.

12. A system according to claim 1, in which the detector and the alarm are located remote from each other.

13. A system according to claim 6, in which the vehicle can approach the detector from any horizontal direction.

14. A system according to claim 5, in which the transmitter includes an encoded infra-red source and associated electronic systems and a rotating mirror contoured to produce the rotating fan shaped beam of infra-red light.

15. A system according to claim 2, in which the fan shaped beam of infra-red light dimension in the plane and a relatively wider dimension in the vertical plane.

16. A system according to claim 1, in which the transmitter includes a static array or Light Emitting Diodes (LEDs).

17. A system according to claim 16, in which the Light Emitting Diodes are arranged in an array of Light Emitting Diodes fin operation in a prearranged manner or sequence to provide in effect a rotating beam of infra-red illumination.

18. A system according to claim 17, in which the Light Emitting Diodes are operated to produce a rotating fan shaped beam of infra-red illumination.

19. A system according to claim 1, in which the detector comprises a detection and alarm function.

20. A system according to claim 1, in which the detector is powered externally or is provided with its own self-contained power source.

21. A system according to claim 1, in which the detector is fixed to a substrate at a strategic location or the detector is worn or provided on the apparel or clothing of the person for activation byte infra-red signal when the person having the detector and the transmitter are within a predetermined distance of each other.

22. A system according to claim 1, in which the alarm includes an audible alarm, a visible alarm, a digital alarm or other warning device, including combinations thereof.

23. A system according to claim 1, in which the signal transmitted by the transmitter is used to remotely operate an access control device.

24. A system according to claim 23, in which the access control device includes a boom gate, a roller door, a swing door, a sliding door, a barrier, or other moving or operating mechanisms.

25. A method of warning a person of the proximity of an object or event comprising associating the object or event with a transmitter for transmitting an infra-red signal through substantially 360° around the transmitter, the signal triggering a detector, said transmitter being mounted on a moveable vehicle, said movable vehicle being movable with respect to the detector, said detector being tuned to only detect the signal transmitted by the transmitter so that when the person and object or event are located within a predetermined distance from each other the transmitter transmits the signal to the detector such that the detector activates an alarm in order to provide an early and distinct warning to the person in the vicinity of the object or event in order to alert the person to the presence of the object or event.

26. A method of warning a person of the proximity of an object or event comprising associating the object or event with a transmitter for transmitting an infra-red signal through substantially 360° around the transmitter, the signal triggering a detector, said transmitter being mounted on a moveable vehicle, said movable vehicle being movable with respect to the detector, said detector being tuned to only detect the signal transmitted by the transmitter so that when the person or object or event are located within a predetermined distance from each other the transmitter transmits a signal to the detector such that the detector activates an alarm in order to provide an early and distinct warning to the person in the vicinity of the object or event in order to alert the person to the presence of the object or event, wherein the object or event is associated with the transmitter using a movement detection and warning system comprising the transmitter for transmitting a signal in association with the event or object, the signal being adapted for triggering the detector, said detector being tuned to only detect the signal transmitted by the transmitter when the detector is located within a predetermined distance from the transmitter, said detector activating the alarm in response to being triggered byte transmitted signal thereby providing an early and distinct warning to people in the vicinity of the detectors in order to eliminate or reduce the chances of the person sustaining injury.

27. A system according to claim 1, wherein said infra-red signal is transmitted through substantially 360° around the transmitter in a horizontal plane.

28. A system according to claim 1, wherein said infra-red signal is transmitted through about 180° in a vertical plane.

29. A system according to claim 1, wherein said infra-red signal is transmitted through substantially 360° in a horizontal plane and about 180° in a vertical plane.

30. A movement detection and warning system for alerting a person to the close proximity of a moving vehicle, said system including a transmitter for transmitting an encoded infrared signal through substantially 360° round the transmitter for a preset time for triggering a detector, said transmitter being mounted on the vehicle so that the transmitter moves in accordance with movement of the vehicle so as to move with respect to the detector, said encoded infrared signal having a relatively narrow dimension in the substantially horizontal plane and a relatively wider dimension in the substantially vertical plane, said detector being tuned to detect the encoded infrared signal transmitted by the transmitter only when the detector is located within a predetermined distance from the transmitter and the infrared signal has been transmitted for the preset time, wherein when the transmitter is located within the predetermined distance from the detector, an alarm is activated in response to the detector sensing the encoded infrared signal for the preset time so as to provide an early and distinct warning to the person in the vicinity of the vehicle in order to eliminate or reduce the chances of the person sustaining injury.

* * * * *

UNITED STATES PATENT AND TRADEMARK OFFICE
CERTIFICATE OF CORRECTION

PATENT NO. : 6,650,242 B2  Page 1 of 1
DATED : November 18, 2003
INVENTOR(S) : Clerk et al.

It is certified that error appears in the above-identified patent and that said Letters Patent is hereby corrected as shown below:

Column 9,
Line 4, "die" should read -- the --
Line 7, "wit" should read -- with --
Line 9, "detector" should read -- transmitter --
Line 34, "track" should read -- truck. --
Line 54, "infra-red light dimension" should read -- infra-red light has a narrow dimension --
Line 61, "fin" should read -- for --

Column 10,
Line 7, "byte" should read -- by the --
Line 56, "byte" should read -- by the --

Signed and Sealed this

Fifteenth Day of June, 2004

JON W. DUDAS
*Acting Director of the United States Patent and Trademark Office*